Dec. 29, 1942.    D. W. SHERMAN ET AL    2,306,845

DYNAMOMETER

Filed July 15, 1940    3 Sheets-Sheet 1

Donald W. Sherman
Oscar W. Schroeder
INVENTORS.

BY
ATTORNEY.

Dec. 29, 1942.   D. W. SHERMAN ET AL   2,306,845
DYNAMOMETER
Filed July 15, 1940   3 Sheets-Sheet 2

Donald W. Sherman
Oscar W. Schroeder
INVENTORS.

BY
ATTORNEY.

Dec. 29, 1942. D. W. SHERMAN ET AL 2,306,845
DYNAMOMETER
Filed July 15, 1940 3 Sheets-Sheet 3

Donald W. Sherman
Oscar W. Schroeder
INVENTORS.

BY *Elvin A. Andrus*
ATTORNEY.

Patented Dec. 29, 1942

2,306,845

UNITED STATES PATENT OFFICE 2,306,845

DYNAMOMETER

Donald W. Sherman, Milwaukee, and Oscar W. Schroeder, Wauwatosa, Wis., assignors to A. O. Smith Corporation, Milwaukee, Wis., a corporation of New York Application July 15, 1940, Serial No. 345,582

10 Claims. (Cl. 265—24)

This invention relates to a dynamometer and more particularly to dynamometers for testing the efficiency of automobile engines.

The principal object of the invention is to provide a dynamometer suitable for use in garages and which can be built and sold for much less cost than the present day commercial dynamometers.

Another object is to provide a dynamometer employing the twist of a metal member under torque load for the measurement of the input to the dynamometer.

Another object is to provide a dynamometer employing the multiple disc brake principal and in which the discs are subject to uniform wear.

A more specific object is to provide for movement of the discs laterally after the same have tightened in the keyways from braking pressure.

Other objects will appear hereinafter from the description of an embodiment of the invention illustrated in the accompanying drawings.

Figure 4:
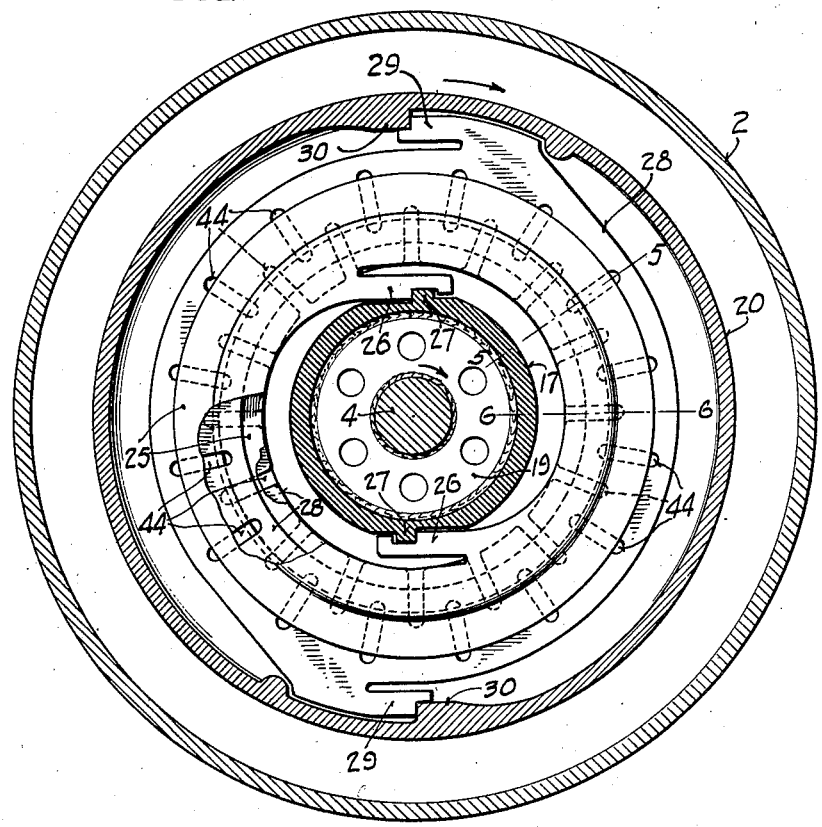
Fig. 4 is a section taken on line 4—4 of Fig. 3 showing the brake discs.
Figure 5:
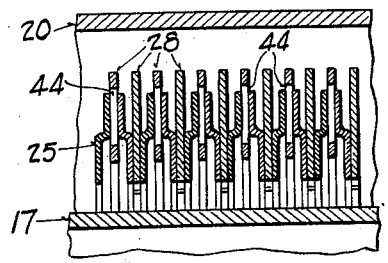
Figure 6:
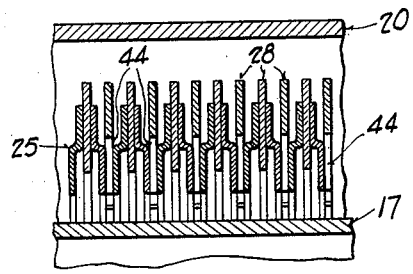

Figs. 5 and 6 are fragmentary sections taken on the line 5—5 and 6—6, respectively, of Fig. 4.

The dynamometer has two revolving drums or cylinders 1 and 2 mounted parallel in the floor of a garage and spaced to receive and support the rear wheels of an automobile. The drums are balanced for high speed rotation and are mounted on bearings 3 at the ends. Drum 1 is an idler drum, while drum 2 constitutes the braking drum for the dynamometer. Both drums may be braking drums if desired.

Figure 1:
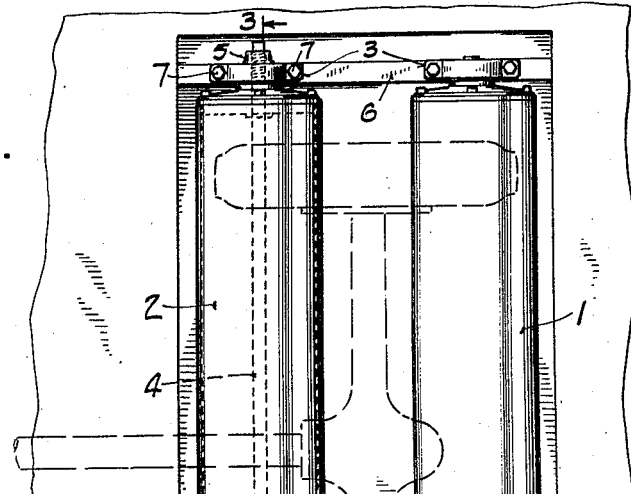
Figure 1 is a top plan view of the dynamometer as installed.
Figure 2:
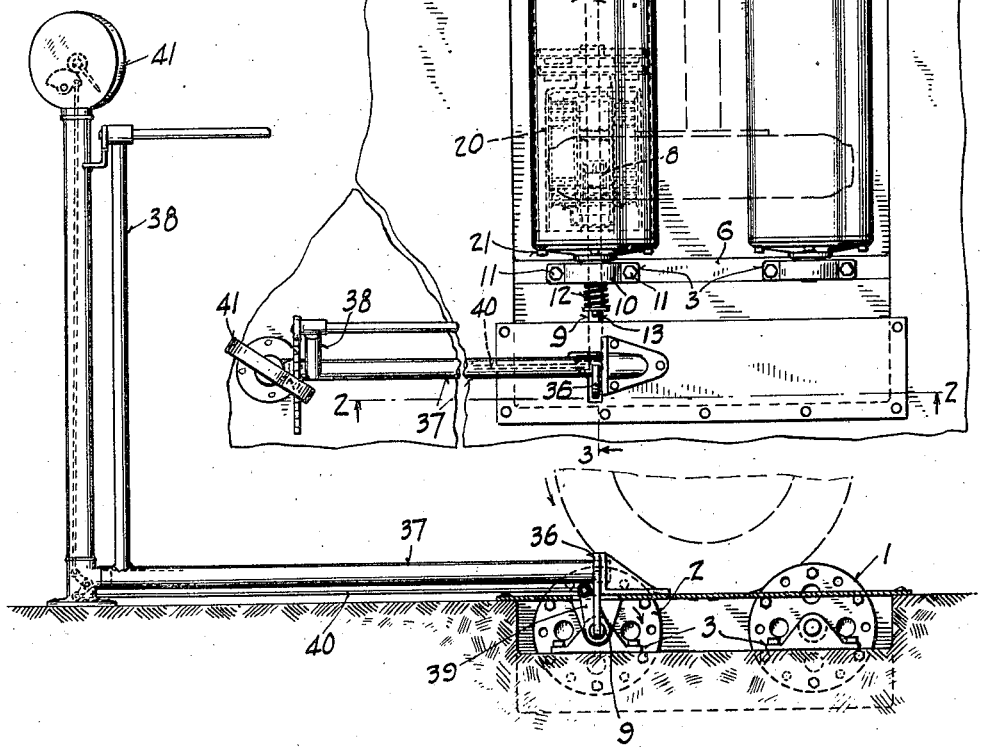
Fig. 2 is a side elevation of the dynamometer, partly in section on the line 2—2 of Fig. 1.
Figure 3:
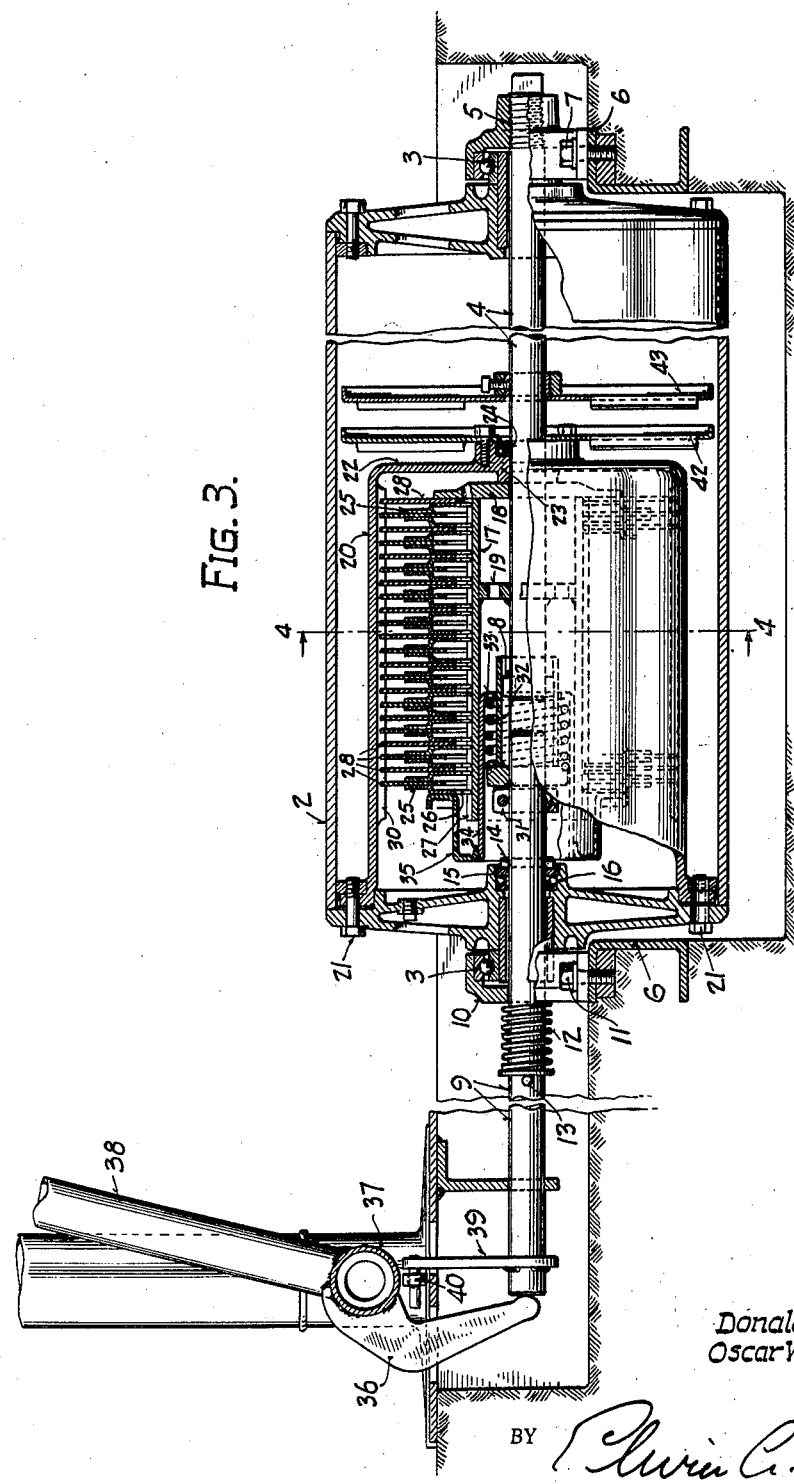
Fig. 3 is a transverse section taken longitudinally through the brake drum on line 3—3 of Fig. 1, parts being broken away.

A torque shaft 4 is disposed axially of drum 2 and passes through a central opening in the right hand bearing 3, Fig. 3, the right hand end of the torque shaft being held stationary by the stationary bearing support 5 into which it is threaded and which is secured to the base 6 by bolts 7. The left hand end of shaft 4 is coupled by a spline coupling 8 to an operating shaft 9 which is disposed in alignment with shaft 4 and can receive limited longitudinal movement relative thereto.

The shaft 9 passes through a central opening in the stationary bearing support 10 secured by bolts 11 to the base 6, and the support 10 serves to house bearing 3 for supporting the left hand end of drum 2. The shaft 9 is biased to the left, Fig. 3, by the coil spring 12 engaging support 10 and a pin 13 on the shaft, the outward movement of the shaft being limited by the pin 14 engaging the bushing 15 of the oil seal 16 in the head of the drum 2.

The torque shaft 4 supports a concentric tubular member 17 by means of a right hand end bearing plate 18 which is free to turn on shaft 4 and a left hand spider 19 which is welded to the member 17 and to the shaft 4 near the left end of the latter.

A cylindrical casing 20 surrounds the member 17 and has its left hand end secured to the head of drum 2 as by bolts 21 and its right hand end closed by a head 22 forming a bearing 23 on shaft 4. An oil seal 24 is provided in the bearing 23.

In the circumferential space between member 17 and casing 20 there are a series of brake discs, alternate discs being secured to member 17 and to casing 20, respectively. The brake discs 25 which are secured to member 17 have inwardly extending flexible tongues 26 which engage at their ends with projections 27 on the member 17 to prevent relative rotary movement between the discs 25 and the member 17. The projections 27 extend longitudinally of member 17 to allow the discs 25 to slide longitudinally along the member.

The brake discs 28 disposed between discs 25 have outwardly extending flexible tongues 29 which engage projections 30 extending longitudinally on the inside of casing 20. The projections 30 provide for longitudinal movement of discs 28 in casing 20.

In operation, as the discs 25 and 29 are pressed together to apply the braking force they move relatively longitudinally and the tongues 26 and 29 slide along the respective projections 27 and 30 until they are forced to engage the projections by reason of the braking force, at which time the tongues will stop sliding. From then on the flexibility of the tongues comes into play and provides for the required final compressing of the discs together. By reason of this flexibility of the tongues 26 and 29, the discs move to effect an equal pressure on all of the discs. This is important where a large number of discs is employed.

The mechanism for pressing the discs together comprises the operating shaft 9, a flange or abutment 31 on the inner end of the shaft, a coil spring 32 disposed to have one end engaged by the abutment 31 and the other end press against an inner flange 33 on a tubular slide 34 mounted on the inside of member 17. The slide 34 has its outer end secured to an end plate 35 which engages the left hand disc 25. The right hand disc 28 engages the end plate 18 and the discs 25 and 28 are pressed between plates 35 and 18.

The shaft 9 is pressed inwardly, to compress the discs, by means of lever 36 engaging the outer end of the shaft and secured to a pivoted shaft 37 extending forward to a location adjacent the forward end of the automobile. A handle 38 secured to the forward end of shaft 37 provides for manual operation of it.

Assuming that an automobile is being tested and that its hind wheels are turning, thereby turning drums 1 and 2, handle 38 is operated to compress the discs and apply the braking action. As this is done, discs 25 tend to rotate with discs 28 and thereby apply a torque force through member 17 and spider 19 to shaft 4, tending to twist the latter. The twist of the left end of shaft 4 effects turning of shaft 9 and this is measured by means of a crank 39, near the outer end of shaft 9, a link 40 and a gauge 41 located near handle 38. The gauge 41 is calibrated to show the information desired as to power of the automobile engine.

In order to dissipate the heat of the brake discs 25 and 28, the casing 20 is preferably filled with a cooling fluid of oil or water. Air is circulated on the outside of casing 20 and through drum 2 by means of a fan 42 mounted on the end of casing 20 to rotate with the latter and a similar fan 43 mounted on shaft 4 to be relatively stationary. Slots 44 in the discs 28 permit circulation of cooling fluid over the braking surfaces.

The dynamometer has many advantages over the hydraulic type of dynamometer. In the present dynamometer the heat developed does not affect the reading since the latter only results from the torque transmitted to shaft 4. The large number of discs employed and the construction assuring equalization of pressure between all discs makes it possible to use the dynamometer in repeated operations without undue wear and without high maintenance cost.

Cheaper material can be utilized for the discs since the unit pressure is low. The low heat input per disc provides greater ease in cooling. All of this is a direct result of the use of flexible tongues for mounting the discs since equalization of pressure can be obtained on a larger number of discs.

Various embodiments of the invention may be employed within the scope of the claims.

The invention is claimed as follows:

1. In a dynamometer, a shaft, a sleeve concentric with the shaft, two connections spaced apart longitudinally of which one secures one section of the shaft to the sleeve and the other secures another section of the shaft to a rigid support to prevent rotation of the shaft, a member disposed concentric with the sleeve for unlimited rotation, a multiple disc brake between the sleeve and member, means to engage the brake to transmit torque from the rotatable member to the sleeve, and means to measure the twist produced in the shaft by the torque.

2. In a dynamometer, a shaft, a connection between one section of the shaft and a support to prevent rotation of the shaft, a rotatably mounted member concentric with the shaft, a multiple disc brake, means for connecting one member of the brake to the rotatable member, means for connecting the other member of the brake to the shaft at a point spaced longitudinally from the section restrained against rotation, means to engage the brake surfaces to cause transmission of torque from the rotatable member to the shaft, and means to measure the twist produced in the shaft by the torque.

3. In a dynamometer, a shaft, means connecting one section of the shaft to a rigid support to prevent rotation of the shaft, a sleeve concentric with the shaft and rigidly secured thereto at a section spaced longitudinally from the section held by the support, a drum mounted for rotation concentric with the shaft and sleeve, a plurality of discs disposed in axial alignment between the drum and sleeve, laterally flexible means connecting alternate discs to the sleeve, similar means connecting the remaining discs to the drum, means to force the discs into lateral engagement to transmit torque from the drum to the sleeve, and means to measure the twist produced in the shaft by the torque.

4. In a dynamometer, a rotatably mounted member, a concentric member restrained against rotation and having one portion free to twist under torque load, a plurality of discs disposed in axial alignment between the rotatable and non-rotatable members, laterally flexible means connecting alternate discs to the rotatable member, laterally flexible means connecting the other discs to the non-rotatable member, means to force the discs into lateral engagement to transmit torque from the rotatable to the non-rotatable member, and means to measure the twist in the non-rotating member produced by the torque transmitted to it.

5. In a dynamometer, a cylinder having its opposite end heads journaled in bearings for unlimited rotation, a non-rotatable shaft extending freely through said bearings and the center of the cylinder, means securing one end of the shaft to a stationary member, slip means to transmit variable torque to the shaft from the cylinder during rotation thereof, and means to indicate the torque load effecting a twisting of the shaft.

6. In a dynamometer, a sealed rotatably mounted drum having a relatively non-rotating shaft extending axially therethrough, a multiple disc brake within the drum to transmit torque from said drum to said shaft, means to measure the torque transmitted to said shaft, a heat transmitting fluid in said drum, and means for circulating cooling media against the outside of said drum.

7. In a dynamometer, a rotatably mounted drum, a relatively non-rotating shaft extending axially through said drum and having one end fastened against movement, a multiple disc brake in said drum having discs secured to said drum for rotation therewith and alternate discs secured to said shaft, means to indicate the torque transmitted to said shaft from the rotatable drum when the discs are in frictional engagement with one another, the free end of said shaft being coupled to the fastened end of said shaft by a longitudinally movable member to provide for relative longitudinal movement for the free end section, a pressure head mounted on said longitudinally movable section of said shaft in said drum to press said brake discs into engagement, means to move said longitudinally movable section of the shaft in a direction to release said discs from pressure, and means to move said section of shaft in a direction to apply pressure on said discs.

8. In a dynamometer, a cylinder mounted for rotation on end bearings, a drum secured therein to rotate therewith, means to circulate cooling media between said drum and cylinder, a non-rotating shaft extending axially through said drum and cylinder, a brake in said drum to transmit torque to said shaft from said rotating drum, and means to indicate the amount of torque transmitted to said shaft by said brake.

9. In a dynamometer, a cylinder mounted for rotation on end bearings, a drum secured therein to rotate therewith, a non-rotating longitudinally movable shaft extending axially into said drum and cylinder, a brake in said drum to transmit torque to said shaft from said rotatable drum, means including yieldable torque absorbing means to indicate the torque being transmitted to said shaft, and means for operating said brake responsive to a longitudinal movement of said shaft.

10. In a dynamometer, a rotating drum mounted for rotation, a shaft extending axially into one end of said drum and having a fixed outer end, means to transmit torque to the inner end of said shaft from said drum during rotation thereof, a second shaft extending axially into the other end of said drum and disposed for longitudinal movement to control the operation of said torque transmitting means, a coupling between the inner ends of said shafts for transmitting any twist in the first shaft resulting from said torque to the second shaft in the form of rotation of the latter, and indicating means operated in response to rotation of said second shaft resulting from the twisting of said first named shaft under torque load.

DONALD W. SHERMAN.
OSCAR W. SCHROEDER.